April 2, 1946.　　　G. C. HARTLEY ET AL　　　2,397,604
ELECTRICAL INDICATION AT A DISTANCE
Filed June 17, 1943　　　8 Sheets-Sheet 2
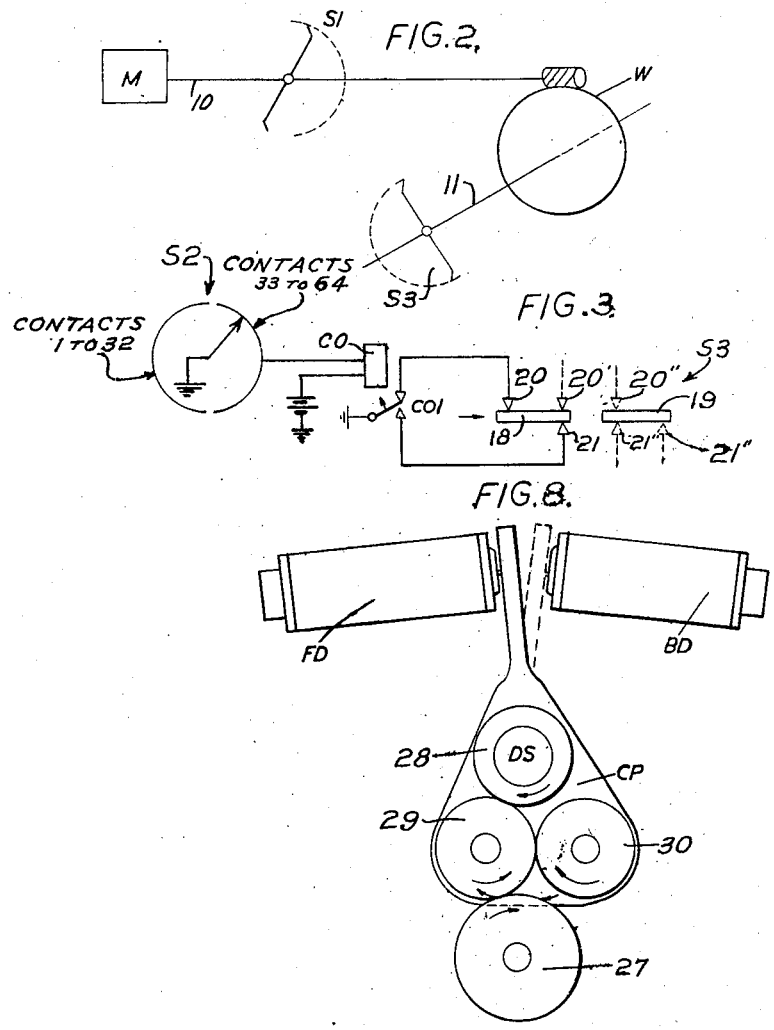
Inventors
George Clifford Hartley.
Eric Malcolm Swift McWhirter.
John Hardley.
By
Attorney

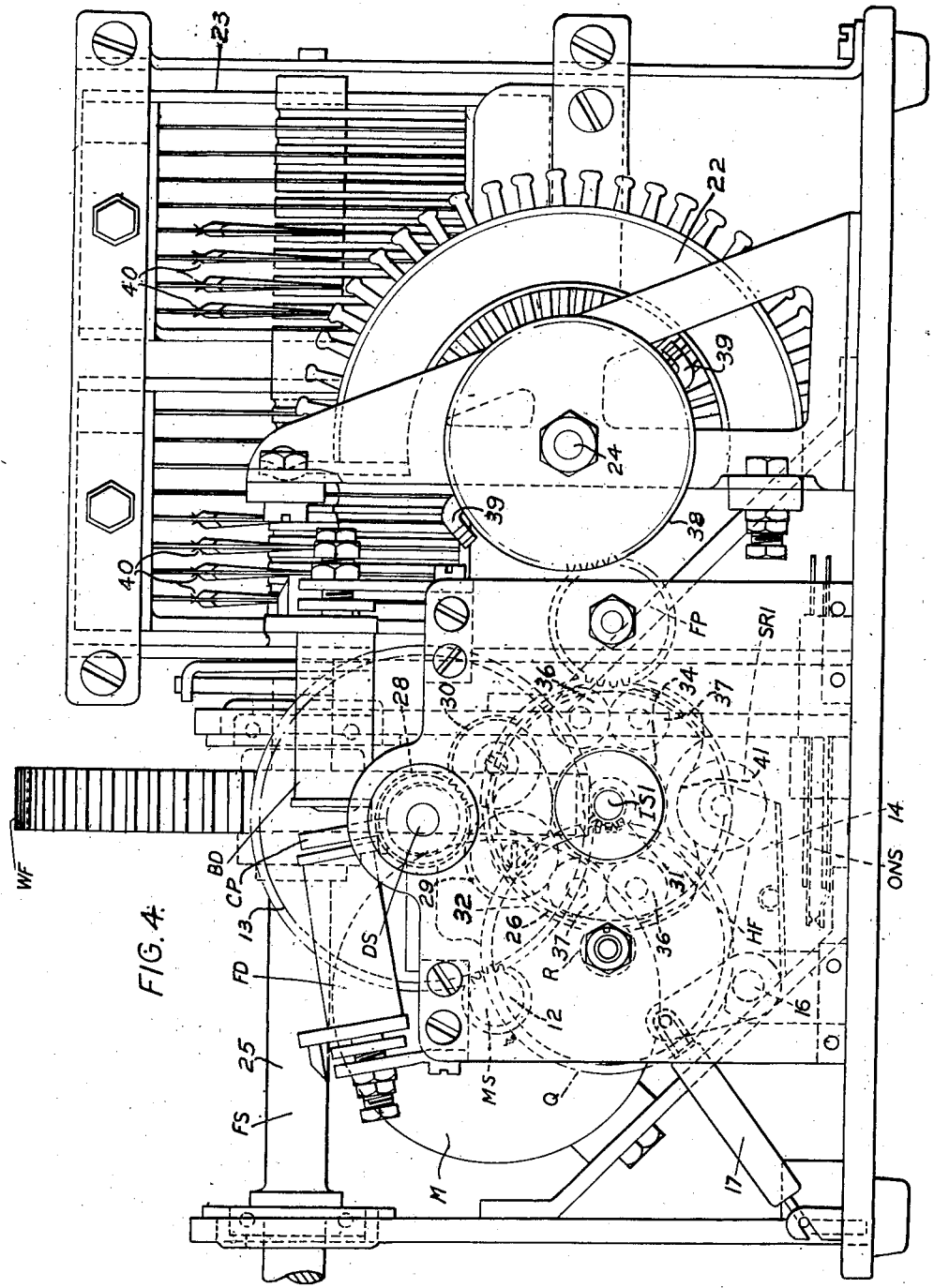

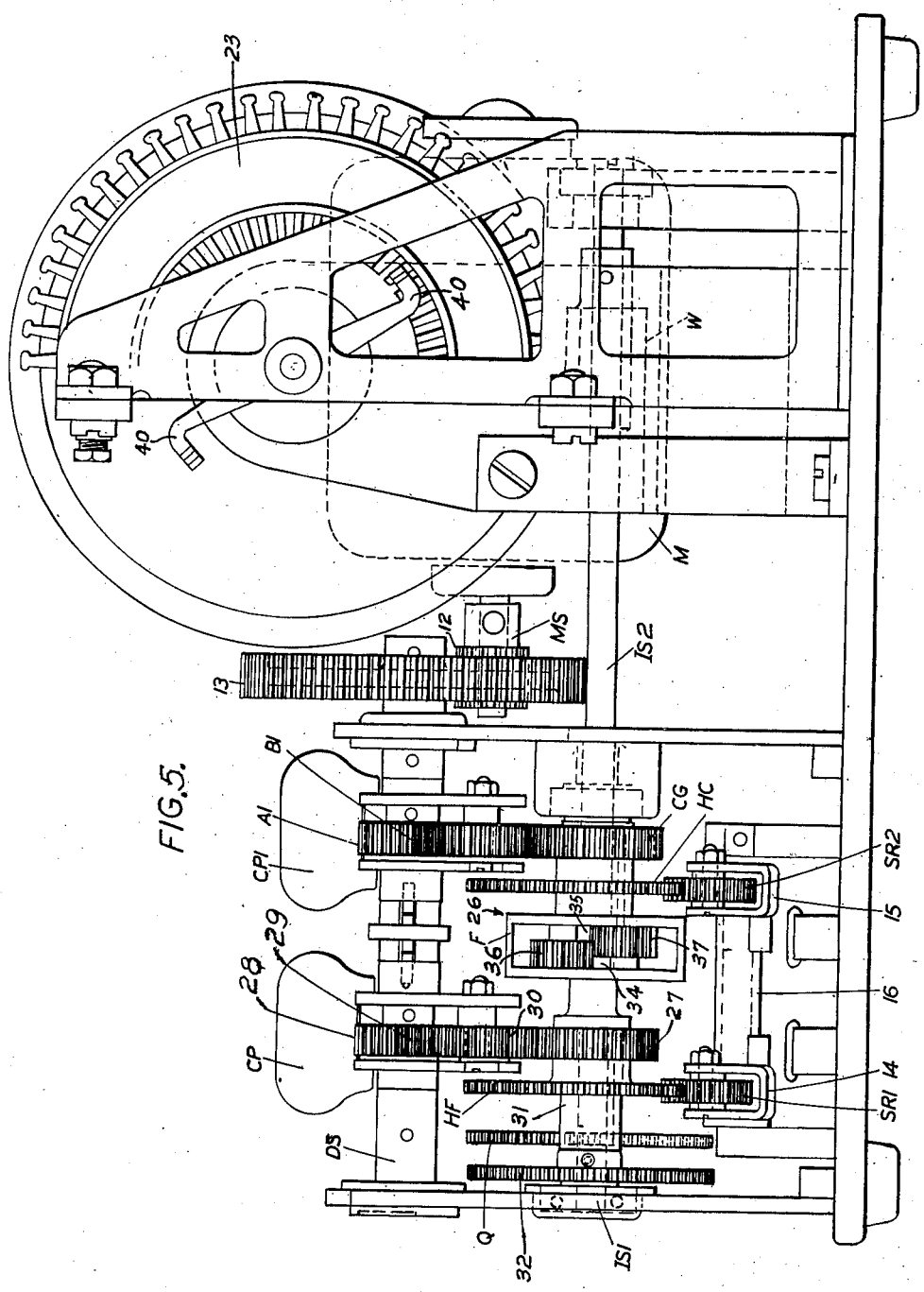

April 2, 1946.     G. C. HARTLEY ET AL     2,397,604
ELECTRICAL INDICATION AT A DISTANCE
Filed June 17, 1943     8 Sheets-Sheet 5

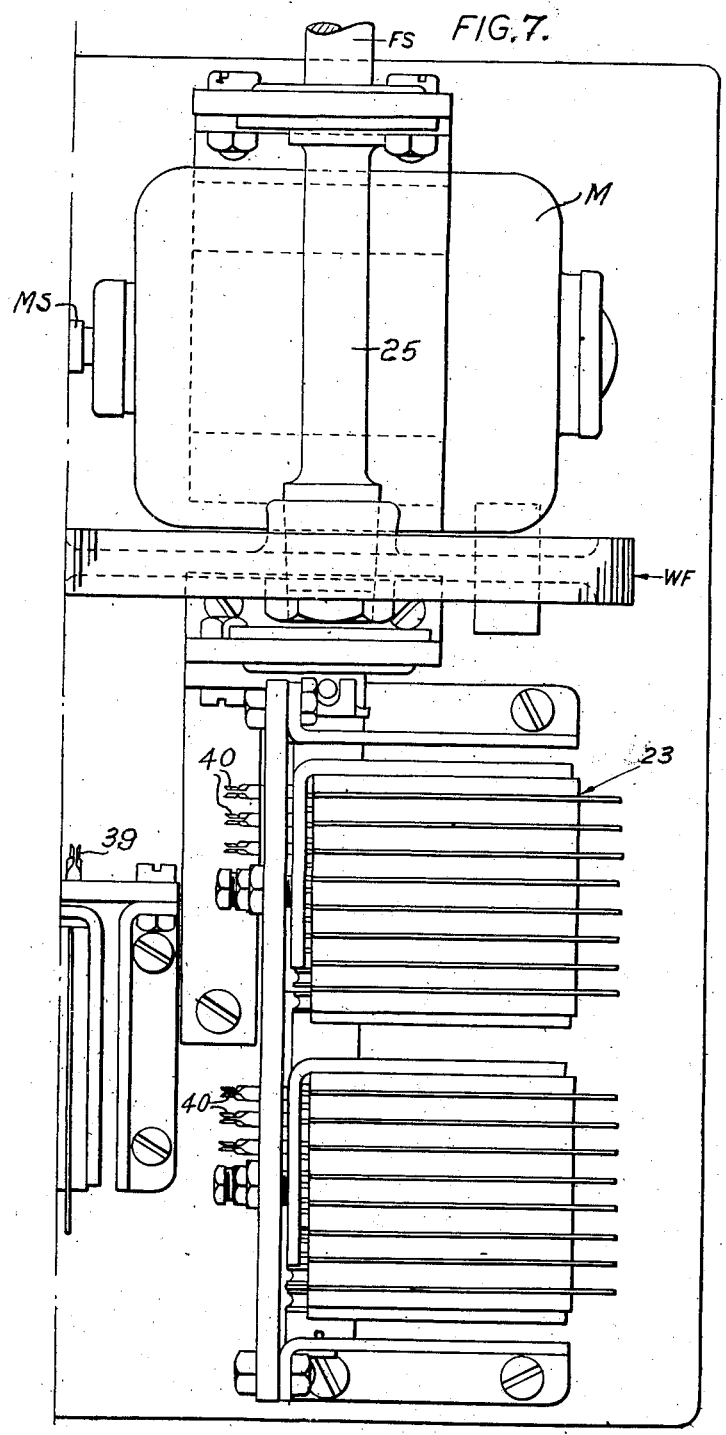

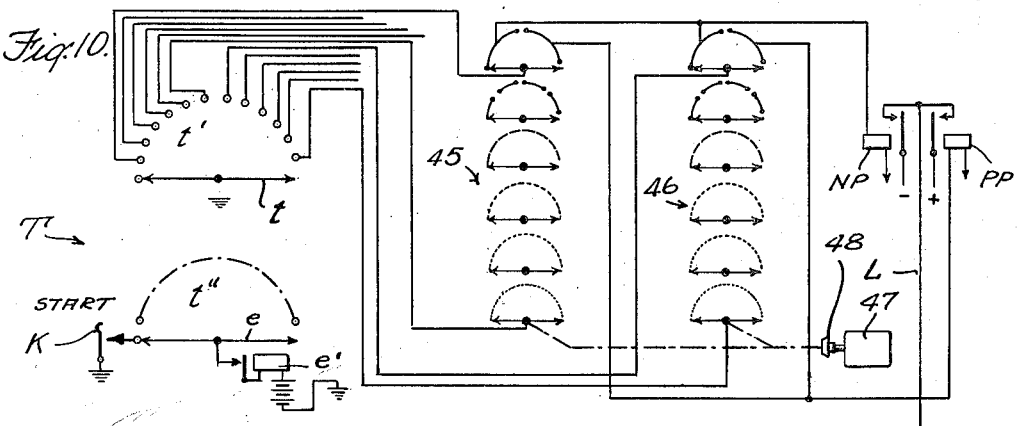
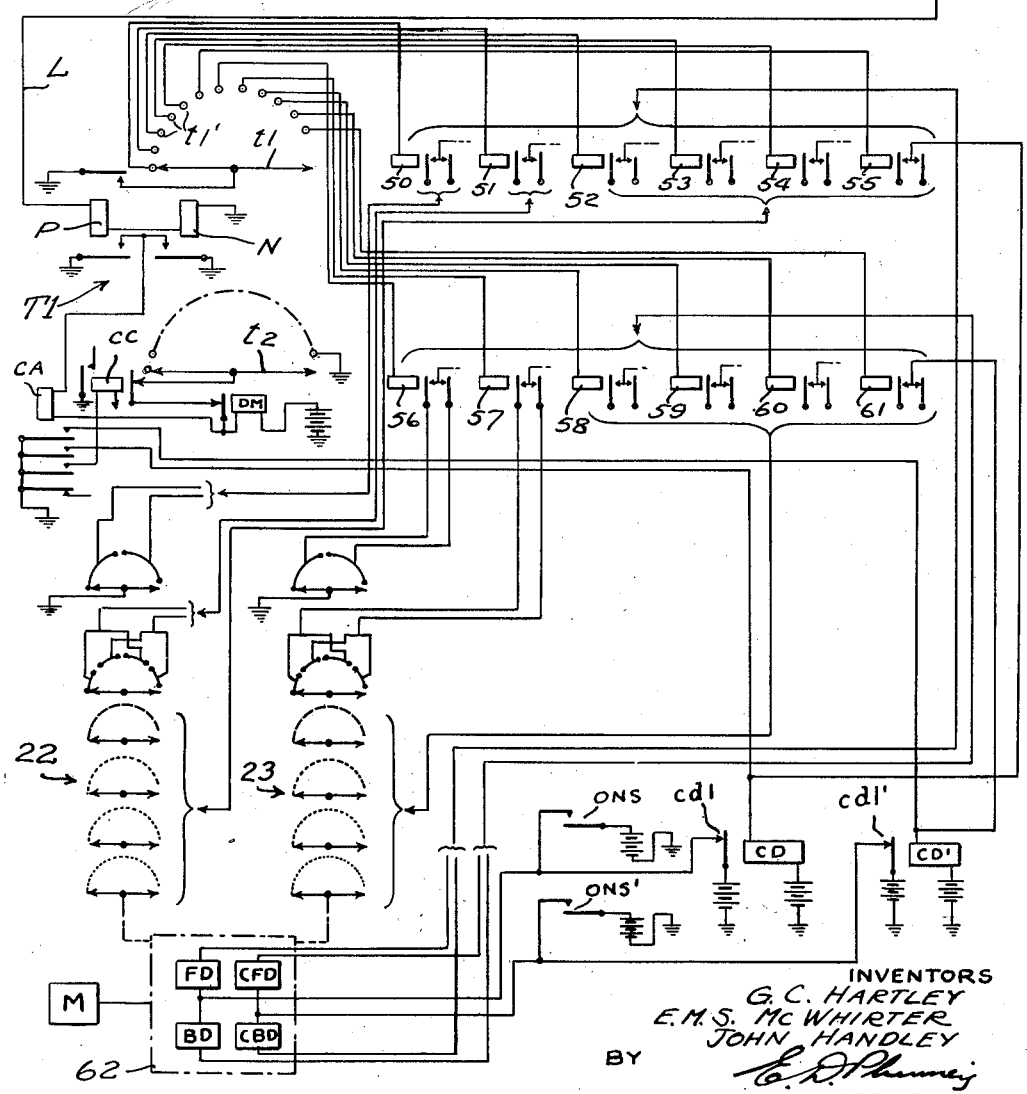

Patented Apr. 2, 1946

2,397,604

UNITED STATES PATENT OFFICE 2,397,604

ELECTRICAL INDICATION AT A DISTANCE

George Clifford Hartley, Eric Malcolm Swift McWhirter, and John Handley, London, England, assignors to Standard Telephone and Cables Limited, London, England, a British company Application June 17, 1943, Serial No. 491,136
In Great Britain March 11, 1941

11 Claims. (Cl. 177—351)

This invention relates to a method and means for the electrical remote indication of bearings or other magnitudes.

According to the present invention there is provided an electrical system for the remote indication of a bearing or other magnitude comprising at a transmitter a multi-bank uniselector switch having the contacts of the respective banks divided into halves, quarters and so on, means for setting the wipers of the said switch in accordance with the magnitude to be transmitted, and a distributor for controlling transmitting means over the wipers of the banks in turn, for the purpose of deriving a train of digital signal elements representing the bearing or magnitude expressed as a number in radix two, each signal element consisting of one of two possible conditions, and means for transmitting the signal elements to a distant point.

The invention will be described with reference to the accompanying drawings in which:

Figure 2 is a schematic diagram illustrating a two stage switch for obtaining a greater number of switch positions than can be obtained with one switch;

Figure 3 is a schematic diagram illustrating one manner of connecting the two stage switch of Fig. 2;

Figure 4 is an end elevational view of a two stage uni-selector switch and operating mechanism therefor;

Figure 5 is a side elevational view of the switch of Figure 4 with certain parts removed;

Figures 6 and 7 are plan views of two half-portions of the switch, the two views forming the complete plan view when placed side by side;

Figure 8 is a side elevational view of one of the magnetic clutches of the switch;

Figure 10 is a circuit diagram of the embodiment of the invention shown in Figs. 4 to 9 inclusive.

Figure 1:
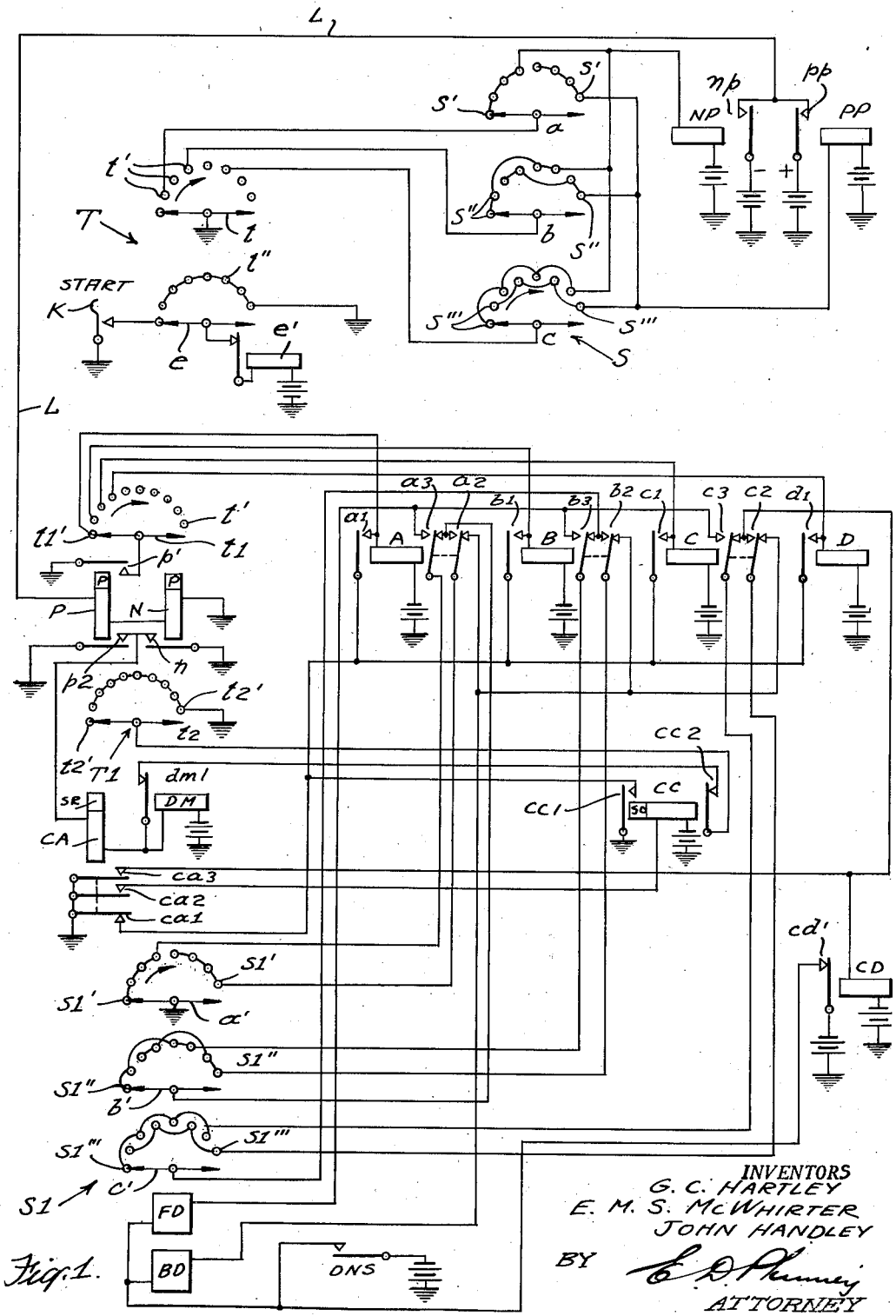
Figure 1 is a circuit diagram of a sending and receiving apparatus for transmitting the signals representing the bearing or magnitude.
Figure 6:
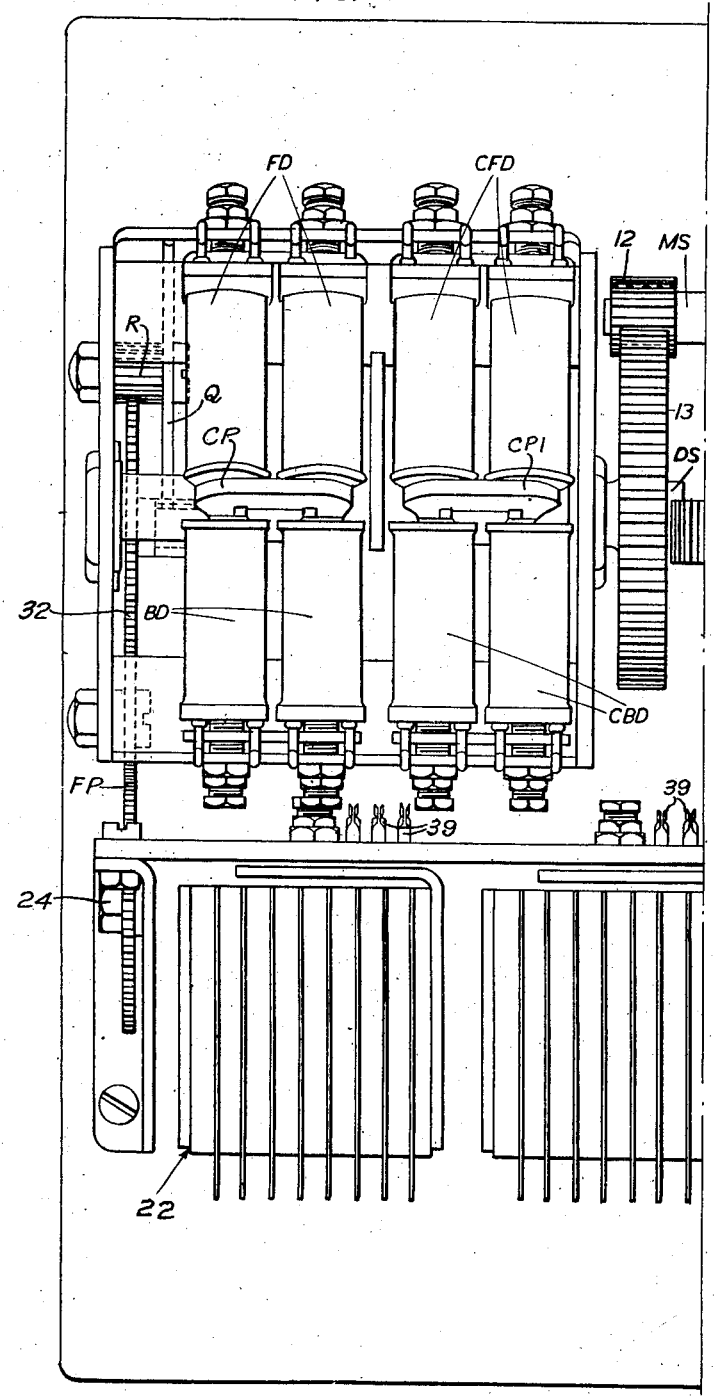

The magnitude of any measurable quantity is usually expressed by a number or series of numbers and in many cases such numbers are mechanically indicated by the position of a rotating shaft or shafts of some measuring device. In the particular case of the invention, the bearing of an aeroplane is expressed as so many degrees of angle and a physical indication can be obtained, for example, from a shaft which rotates by the same number of degrees from a zero position. In order to convey the indication to some other place the number representing the bearing (or other quantity of interest) is first transformed into the corresponding number in radix two, which number is used as a code for transmission to the other place.

In the numbering system known as "radix two" no number higher than 1 is ever used for a single digit. In writing a succession of increasing numbers, 1 is added each time to the previous number, but whenever the resultant is equal to 2, a zero is set down for the number and 1 is carried to the left to be added to the next digit to the left. The following table will indicate how this is done. The ordinary numbers (based on the usual numbering system, known as "radix ten") are shown at the left, while the corresponding radix two numbers are shown at the right.

1. 1
2. 10
3. 11
4. 100
5. 101
6. 110
7. 111
8. 1000
9. 1001
10. 1010
11. 1011
12. 1100

In transforming the number from radix ten to radix two the simplest way is to split the number up into a summation of powers of 2, placing the greatest power of 2 first and then arranging the powers of 2 in descending scale. For instance, the number 21 would equal $2^4 + 2^2 + 2^0$. Then replace each 2 with 10 so that it reads as follows: $10^4 + 10^2 + 10^0$, which added together numerically will give 10,101.

This transformation in the case of the bearing of an aeroplane is equivalent to dividing the 360° within which the bearing lies into sectors of 180°, 90°, 45° and so on up to any desired accuracy of expression. Each digit of a number expressed in radix two has only two possible values, one and zero. Such a number of twelve digits expresses a bearing to within an accuracy of not quite five minutes since $2^{12}=4096$ and 5 minutes = 1/4320 of 360°. The transmission of the number may take place in a manner similar to that of a teleprinter code, the succession of twelve impulse periods, each of which may be occupied by either a marking or spacing condition, being preceded by a start impulse of a spacing condition and succeeded by a stop impulse of a marking condition.

It is to be noted that in the teleprinter code each impulse period occupies 20 milliseconds. This is for the purpose of transmitting the code combination of impulses over long lines. The period necessary to receive and translate the condition existing in an impulse period is, however, only one or two milliseconds. Consequently, for the purposes of the present invention each impulse period may be considerably reduced from the 20 milliseconds of the teleprinter code, provided the lines over which transmission is to take place are electrically not very long.

In order to simplify the apparatus to be used it is preferred to transmit the code combination of impulses as a series of signal elements or impulses separated by intervals of zero potential, as in this way the impulses themselves may be caused to step round the distributor at the receiver and so obviate the necessity for the careful synchronisation between the distributors at the transmitter and receiver which is necessary even with start-stop transmission. It is to be noted that the speeds of transmitter and receiver distributors require to agree more closely, the greater the number of elements in the code used.

The same mechanism may be used at the transmitter to be set to the bearing to be transmitted as is finally set at the receiver in accordance with the received code combination, i. e. the mechanism for translating a bearing into a code and for translating a code into a bearing may be of the same mechanical construction. The principle used in one example, according to the invention is illustrated in Fig. 1. S and T are uniselector switches, such as are used in automatic telephone exchange systems, and each consists of a wiper or wipers moving over and making contact with a set or sets respectively of bank contacts. The switch S is set to the bearing to be transmitted and switch T set into rotation. The switch S has a plurality of wipers each adapted to cooperate with a set of bank contacts. The number of wipers and sets of bank contacts will depend on the maximum number of digits in the radix two number to be transmitted. For purposes of illustration we have indicated wiping contacts $a$, $b$ and $c$ and three sets of bank contacts, S', S'' and S''', which are engaged, respectively, by the wiping contacts. Switch T has one wiper $t$ connected to ground, and another, $e$, connected to the switch operating device. Alternate contacts in the switch bank $t'$ are unconnected and the remaining contacts are connected in turn to the wipers $a$, $b$ and $c$ of successive switch banks of switch S. In order to explain the principle used for the conversion of a bearing into a number in radix two, the very simple case of a number of three digits is assumed.

The bank of contacts S' swept over by wiper $a$ of switch S is divided into two halves. The contacts in each half are connected together and to relays NP and PP respectively. When the wiper $t$ of switch T moves on to the contact connected to wiper $a$ of switch S, the relay NP or the relay PP is energised, according to whether the wipers of switch S are standing on a contact in the first or second half of the contact bank S' respectively.

The contacts $pp$ and $np$ are the contacts of relays PP and NP, respectively. Negative or positive potential is connected to the line L by contacts $np$ of relay NP or contacts $pp$ of relay PP, according to which relay is operated, for the first digit of the number being transmitted. When wiper $t$ moves on to its next contact, the relay which was energised is de-energised, thus giving an interval during which zero potential is connected to line L.

Of the contacts S'' moved over by wiper $b$ of switch S, contacts in each alternate quarter are connected together. Contacts in the first and third quarters are connected to relay NP and those in the second and fourth quarters to relay PP. When wiper $t$ moves on to the contact connected to wiper $b$ of switch S, therefore, relay NP or relay PP is energised according to the quarter of the switch bank in which is the contact on which wiper $b$ is standing.

The contacts S''' moved over by wiper $c$ of switch S in each eighth of the bank are connected together and alternate eighths are connected to relays NP and PP.

It will be seen that the value of each digit of the number is transmitted by the sign of the potential connected to line L and that the code elements representing digital values are separated by intervals of zero potential. The value of the first digit indicates within which half of the circle the bearing lies, the value of the second digit the quarter within the half denoted by the value of the first digit and the third digit denotes the eighth within the quarter denoted by the values of the first and second digits.

The switch T may be driven by an electric motor or by the self-interrupting stepping magnet $e$, as shown. In either case the circuit of the driving means may be closed when commencement of transmission is desired and automatically opened when the switch reaches normal position. In the arrangement shown, all but the first contact of the bank of contacts $t''$ wiped by the wiper $e$ are connected together and to ground, while the first contact is connected to one contact of the starting key K, the other contact of the key being connected to ground. When the key K is depressed, ground is applied to the stepping magnet $e'$ through the first contact of the bank $t''$ and the wiper $e$, and the switch starts to rotate, ground on the other contact of the bank continuing the rotation until the wiper reaches the first one again when it will stop if the key has been released.

The switch S may be moved manually to the desired position or may be set into position automatically in accordance with apparatus, the reading of which is to be indicated: for example, to indicate the bearing given by a directional antenna, the same mechanism may rotate the antenna and the switch S until a null position is located.

The impulses transmitted may be received and stored on relays as shown, for example, in the receiving part of the apparatus in the same figure. The line L is connected to polarised relays P and N in series. The relay P has two sets of contacts $p1$ and $p2$, shown above and below the relay, respectively, and the relay N has one set, $n$, shown below the relay N. Contacts $p1$ and $p2$ of relay P are closed on receipt of a positive impulse, whilst contacts $n$ of relay N are closed when a negative impulse is received. A switch T1 having two wipers $t1$ and $t2$, moving over respective banks of contacts $t1'$ and $t2'$ is driven step-by-step by a magnet DM, having interrupter contacts $dm1$, the wipers taking a step when the magnet DM de-energises after having been energised. Contacts $t1'$ of the bank $t1$ are connected to relays A, B, C and D. The relays A, B, C and D each have locking contacts $a1$, $b1$, $c1$, and $d1$, and two additional two-way contacts $a2$, $a3$; $b2$, $b3$; $c2$, $c3$; $d2$, $d3$, respectively, the last two contacts having been omitted from the drawing because the relay D is not used in the example given.

If the first impulse received be positive, relay

P closes contacts p1 and p2. Contacts p1 close a circuit over wiper t1 and the first bank contact for relay A, which, by means of contacts a1 closes a locking circuit for itself to ground through the back contacts cc1 of a slow operating relay CC. If the first impulse be negative, relay A is not energised because relay P does not operate. Whatever the polarity of the first impulse a circuit is closed at contacts p2 or n for the operation of the slow releasing relay CA and magnet DM which drives the selector switch T1. Relay CA opens contacts ca1 for the purpose of releasing any of the storage relays A to D which may have been operated and locked on a previous occasion. It also closes its contacts ca2 for energising a relay CC which, however, is slow to operate and does not close its contacts cc1 to reconnect the locking ground until the storage relays have had time to release. If the first impulse is positive relay A will be operated, as already stated, and will lock itself over its own contact a1 to the ground provided by the contacts cc1 of relay CC. When the first impulse ceases, magnet DM de-energises and wipers t1 and t2 take a step. Relay CA being slow to release does not open its contacts ca1 and ca2 at this time. The second impulse, if positive, is stored on relay B which is energised and locks through its own contacts b1 and the contacts cc1 of relay CC. Succeeding impulses are stored on relays C, D which are locked by the action of their contacts c1 and d1, respectively, and on other relays, not shown, provided according to the number of elements in the code used. Relay CA remains operated in the intervals between impulses and so maintains relay CC operated. When impulses have ceased, relay CA is able to release and to break the circuit of relay CC. When relay CC releases, a circuit is closed for magnet DM over its own interrupter contacts dm1, back contacts cc2 of relay CC, and off normal contacts of bank t2', to drive the distributor switch back to home position.

The manner in which a switch S1 may be set into a position corresponding with that of switch S at the transmitter in accordance with the received and stored impulses is shown for the simple case of three impulses, supposed to be stored on relays A, B and C, respectively, of Fig. 1 by the energisation or nonenergisation of those relays, according to whether the successive impulses were positive or negative.

The switch S1 is assumed to be capable of being driven in either direction by means of an electric motor, relays BD and FD operating, when energised, clutches for the two directions of motion. A relay CD is provided with normally closed contacts cd1 for disconnecting from battery the clutch relays BD and FD, when the setting of the switch S1 has been completed, and for preventing their operation until storage of the code on the relays A to D has been completed. As soon as the first impulse operates relay CA, this relay closes its contacts ca3 thus operating relay CD. This then disconnects the operating battery for the clutch relays by opening its contacts cd1. When storage is complete, relay CA releases, releasing CD and re-connecting the battery to the clutch relays, so that the setting of switch S1 is allowed to proceed. The contacts ons connected in parallel with the contacts cd1 are provided for a purpose to be explained later.

The switch S1 is a selector switch having a plurality of wipers, as, for instance, a', b' and c', which engage separate banks of contacts S1', S1'' and S1''', respectively. The contacts of these banks are connected similarly to the contacts of the banks S', S'' and S''' of the switch S at the transmitter.

Each of the contacts a2 and a3 of the relay A are two-way contacts. The normal position of the contacts a2 connects the second half of the bank of contacts S1' to the relay BD. When the relay A is energized, however, these contacts connect the second half of the bank S1' to the wiper b'. The normal position of the contacts a3 connects the first half of the bank S1' to the wiper b', while the energized position connects the first half of the bank S1' to the relay FD. Likewise, the normal positions of the contacts b2 and c2 connect alternate quarters and eighths, respectively, of the banks S1'' and S1''' of the switch S1 to the relay BD, while the energized positions of these contacts connect the same contacts to the wiper c' and to the relay CD, respectively. The normal positions of the contacts b3 and c3 connect the remaining contacts of the banks S1'' and S1''' to the wiper c and the relay CD, respectively, while the energized positions of these contacts connect these same bank contacts to the relay FD.

For the relay BD or FD to be energised depends upon the positions in which the wipers of switch S1 are standing and upon which of relays A, B, C, D are energised. If the wipers are standing a little behind the desired position, relay FD will operate to drive the wipers forward; if they are standing a little ahead of the desired position, the relay BD will operate to drive the wipers backward. Of course, were the switch S1 always to start from its home position, the backward drive facility afforded by the relay BD and its clutch would become unnecessary and relay FD could become simply the switch driving magnet like DM. Even as shown, the backward drive is simply a time-saving feature.

If the wipers are standing in the half of the bank other than that denoted by the condition of relay A, the relay BD or FD, which ever is necessary to drive the wipers on to the other half is energised. When wiper a' is on the half of the bank denoted by the condition of relay A, the ground on wiper a' is extended to wiper b' through the normally closed contacts a3 and the circuit of relays BD and FD is made dependent on the position of wiper b' and contacts b2 and b3 of relay B. Similarly when the wipers of S1 are standing on the quarter denoted by the condition of relay A and the condition of relay B, the circuit of relays BD and FD is dependent upon the condition of relay C. When the wipers reach the required set of contacts, relay CD is operated over a circuit including contacts c3 or c2, bank contact and wiper c', contacts b2 or b3, bank contact and wiper b', contacts a2 or a3, bank contact and wiper a' which is connected to ground. This disconnects the battery again and stops the operation by opening the contacts cd1 in the battery circuits of relays BD and FD. It will be clear how the arrangement may be applied to any number of impulses in the code combination used.

Mechanical considerations, however, limit the degree of subdivision which can practically be used on one switch, and for a greater number of possible positions than 64 it is necessary to use a two stage setting, as shown diagrammatically in Fig. 2. The motor M is coupled to a shaft 10 driving a marking switch S2 and also through step-down gearing W, which may be a worm and worm-wheel, to a marking switch S3 mounted on a shaft 11, the gear ratio being equal to the number of positions selectable by the switch S3.

Thus if each of switches S2 and S3 can be set to any one of 64 positions, and a 64 to 1 reduction gear is used, the shaft on which the switch S3 is mounted, or some shaft coupled thereto, may be set in any one of 4096 positions, a preliminary setting of S3 and a final setting of S2 being carried out.

The switches shown for illustration in the drawings are of the uniselector type and the contacts are arranged in semi-circles. The wipers are double-ended, and accordingly two hunting operations occur for each revolution of the wiper shaft. When a switch is said to make one revolution, it should be understood that this means one hunting operation. In Fig. 3 a schematic diagram illustrating one manner of connecting the contacts of the two stage switch arrangement of Fig. 2 is shown. For clearness, the contacts of switch S2 are diagrammatically shown arranged in a complete circle with a single-ended wiper; one revolution in this diagram representing one hunting operation of the switch S2.

Since one revolution of switch S2 corresponds to one step of switch S3, there is, for some positions of S2, some doubt as to the precise contact on which the wipers of switch S3 are resting. Ideally, therefore, switch S3 should not move progressively but by a series of steps. This is difficult to achieve mechanically, but the electrical arrangement shown in Fig. 3 is an alternative. Switch S3 is provided with two sets of wipers located apart half the distance between corresponding points on adjacent contacts. The right hand portion of Fig. 3 illustrates on a large scale two consecutive contacts 18 and 19 of switch S3 and two wipers 20 and 21 co-operating therewith. The wiper 18 is in one set and the wiper 19 in the other. The particular wiper to be used is determined by contacts co1 of a relay CO. The relay CO is controlled from a bank of the switch S2 so that when the wipers of switch S2 are on any of the contacts 33 to 64 relay CO is operated, as shown in the left hand portion of Fig. 3; its contacts co1 are in the position shown in the figure, and wiper 20 is used. If the wipers of switch S2 are on any of the contacts 1 to 32, relay CO is not operated and wiper 21 is used. Thus if the wipers of the switches move in the direction of the arrow shown, when switch S2 reaches contact 64, the wipers of S3 will be in the positions shown at 20' and 21', and the wiper used will be in the position 20' near the edge of the contact 18. The wiper 21 will be in position 21' on the next contact 19. The step from 64 to 1 on switch S2 should correspond to one whole step on switch S3 and this is achieved by the change over of the contacts co1 which select the wiper 21 on the next contact for use.

After another half revolution of switch S2, the wiper 21 of switch S3 will be in the position shown at 21" and near the edge of the contact, but the wiper 20 in the corresponding position 20" will be safely on the contact. When relay CO is re-operated, therefore, wiper 20 will be selected and will remain selected during the remaining half revolution of switch S2.

A form of mechanism containing switches 22 and 23, similar to the switches S2 and S3 combined together in one apparatus is shown in Figs. 4 to 9. Although the switches actually shown in the figures happen to be of the 25 point type, no essential difference in principle would be involved if they were replaced by 64 point switches, and in the explanation which follows it will be assumed that the switches are in fact 64 point switches.

It will be obvious to those skilled in the art how the gear ratios will be affected by the number of points in the switch used.

Figure 9:
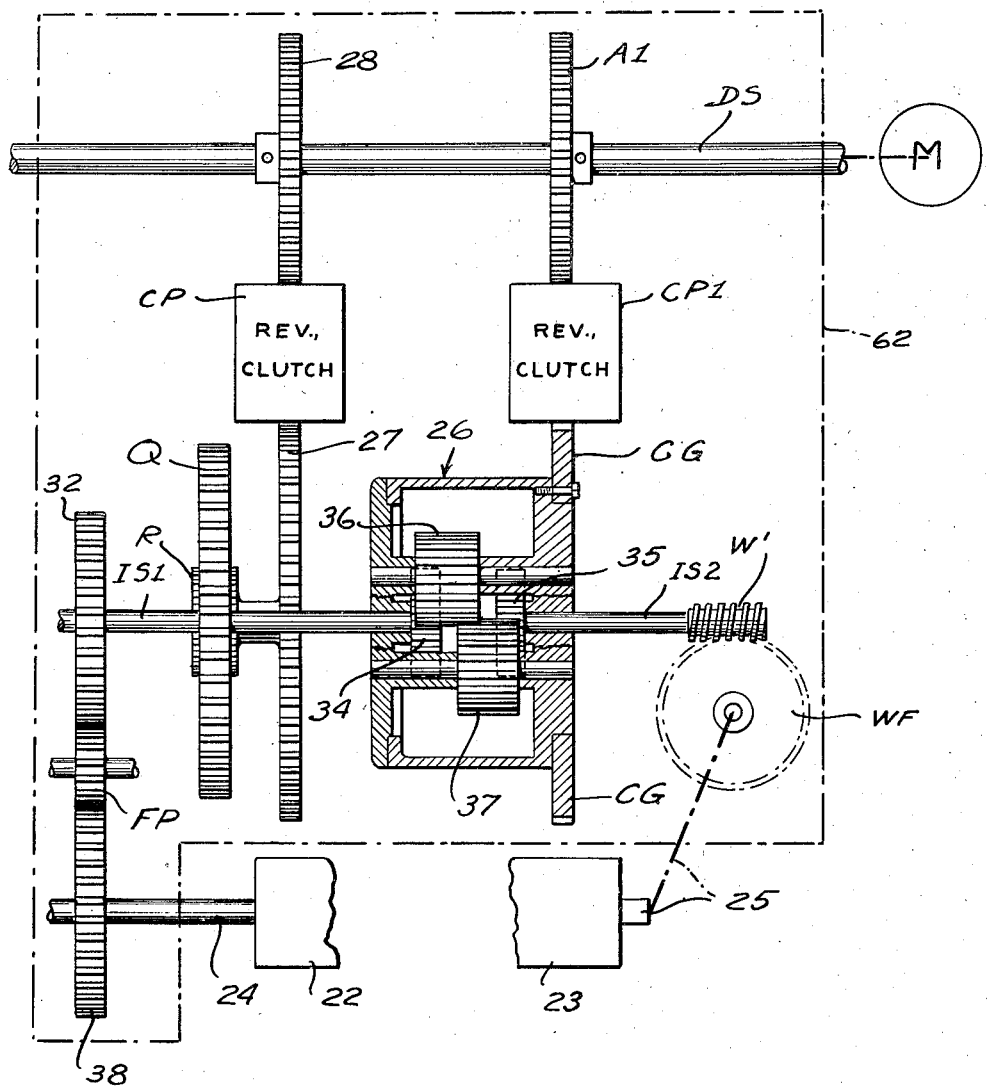
Figure 9 is a sectional elevation of the differential gear forming part of the switch driving mechanism.

In this mechanism, the shafts 24 and 25, respectively, of the two switches 22 and 23 are mechanically coupled through a differential gear 26 in a manner to be more fully explained so that the position of the shaft 25 of 23 depends upon the setting of switch 22 as well as on the setting of switch 23, and the setting of the two switches can also proceed simultaneously. Thus the switch 23 may be set by the first six elements of a twelve element code, whilst the switch 22 is being independently set by the last six elements of such code. Referring to Figs. 5 and 9, the shaft MS of motor M drives through reducing gears 12 and 13 a main shaft DS. Shaft DS drives gear wheels 27 and CG through separate reversible magnetic clutches CP and CP1, the clutch CP being shown in Fig. 8. A gear wheel 28 is on shaft DS and rotates with it. A plate CP is mounted to rock about the axis of shaft DS and carries two gear wheels 29 and 30 in mesh with one another, whilst gear wheel 29 is in mesh with gear wheel 28. In the position of plate CP shown in Fig. 8, gear wheel 29 is also in mesh with gear wheel 27, which therefore rotates in the same direction as shaft DS. Plate CP is controlled by two magnets FD and BD, already described in connection with Fig. 1, the magnet FD being shown in operated condition in Fig. 8. When magnet FD is released and magnet BP operated the plate CP is swung so as to disengage gear wheel 29 from gear wheel 27 and engage gear wheel 30 therewith, thus reversing the direction of drive of gear wheel 27.

The shaft DS drives a gear wheel CG through a similar clutch, comprising a plate CP1 which is rocked in one direction or the other by energisation of magnet CFD or magnet CBD, these magnets being similar to the magnets FD and BD.

The plates CP and CP1 are suitably spring loaded so that when both the clutch magnets acting on one of them are de-energised the drive is completely disengaged and the gear wheel 27 and CG respectively will remain stationary.

The wheel 27 runs freely on an intermediate shaft IS1 and carries a pinion 31. The shaft IS1 carries a gear wheel 32 connected to pinion 31 through an intermediate gear wheel and pinion Q and R mounted on an auxiliary shaft 33 and forming a step down ratio of $1:r_1$. The gear wheel 27 therefore makes $r_1$ turns for one turn of the shaft IS1. Mounted on the shaft IS1 is one of the sun wheels 34 of a differential gear 26 of which the other sun wheel 35 is carried on a second intermediate shaft IS2. The two pairs of spur wheels 36 and 37 in constant mesh are fixed to the carriage F of the differential gear 26, this carriage being free to rotate about the two shafts IS1 and IS2 which are arranged end to end. Each of the spur wheels 36 meshes with the sun wheel 34 and the spur wheels 37, while each of the spur wheels 37 meshes with the sun wheel 35. The wheel CG is fixed to the carriage F, so that if the shaft IS1 is held fixed, the shaft IS2 will make two revolutions for each revolution of the wheel CG. Likewise if the wheel CG is held fixed, the shaft IS2 will make one revolution for each revolution of the shaft IS1. If both the shaft IS1 and the wheel CG rotate, then the motion of the shaft IS2 will be the sum of the two rotations. Thus if wheel CG makes $n$ turns and wheel 27 makes $m$ turns, the shaft IS2 will make $2n+m/r_1$ turns.

The wipers 39 of the switch 22 are driven from gear wheel 32 which is fixed to the shaft 1S1 by an intermediate pinion wheel FP which drives a gear wheel 38 mounted on the shaft 24 of switch 22, this gear wheel 38 being the same size as the gear wheel 32. The wipers 40 of switch 23 are driven from shaft 1S2 through a gear comprising a worm wheel WF and worm W' giving a reduction ratio of 1:$r_2$, so that under the conditions just stated these wipers will make $2n/r_2 + m/r_1 \cdot r_2$ revolutions. At the same time the wipers 39 of switch 22 make $m/r_1$ revolutions, assuming that there is no speed change in the drive through the pinion FP. The ratios $r_1$ and $r_2$ are preferably chosen so that when $m=1$ the wipers 39 of 22 advance one step; and when $n=\frac{1}{2}$ and $m=0$ the wipers 40 of 23 advance one step: the consequence of this is that if each switch has $p$ steps then one revolution of the wheel 27 will cause the wipers 40 of 23 to move $l/p^{th}$ of a step. Under the stated conditions the switch 23 will advance by $2n+m/p$ steps.

The choice of the value $\frac{1}{2}$ for $n$ is necessitated by the 1:2 speed change through the differential gear between the wheel CG and the shaft 1S2: The effect produced is that the motor will drive the switch 23 twice as fast as 22. Provided that the speed of 23 is not so great as to interfere with the clutching and de-clutching operations, this is immaterial.

However, if desired, a 2:1 reduction gear (not shown) could be interposed between the wheel CG and the carriage F. In this case the motor would drive the two switches at the same speed.

In the particular case when $p=64$, the first six units of the code determine $m$ and the last six determine $n$ so that the wipers of switch 23 and the shaft 25 on which they are mounted will advance so many whole steps plus so many sixty-fourths of a step, thus repeating the bearing to an accuracy of 1 in 4096. Thus the shaft 25 on which the wipers 40 of switch 23 are mounted or any other shaft suitably connected thereto can be used to repeat mechanically the original bearing, or alternatively the settings of the two switches can be used to specify the bearing electrically and to repeat it if desired to some other point.

In Fig. 10 is illustrated a circuit for obtaining the accuracy of 1 in 4096, utilizing the mechanism shown in Figs. 2 to 9 inclusive. In this arrangement the transmitter is provided with a pair of switches 45 and 46 each of which has six banks of contacts and associated wipers. The shafts of the two switches are geared together by means of the gear box 47 and the setting of the switches may be accomplished by means of the knob 48. These two switches correspond to the switches S2 and S3 of Fig. 2 and each bank of contacts has 64 contacts for carrying out the example given.

The switch T is the same as the switch T of Fig. 1 except that there are 13 contacts on each of the two contact banks $t'$ and $t''$. The first contact is the contact upon which the switch rests normally. The other 12 contacts are connected to the wipers of the switches 45 and 46, the first six contacts being connected to wipers 1 to 6 of the switch 45 and the 7th to the 12th contact being connected in regular order to the wipers of the switch 46.

The contacts of the various banks of the switches 45 and 46 are arranged similarly to those of the switch S of Fig. 1. The first bank of contacts of switch 45 is divided in half, the contacts of the first half being connected together and to the relay NP, and the contacts of the second half being connected together and to the relay PP. The second bank of contacts is divided into four parts, alternate parts going to the two relays NP and PP, and the remaining banks of the switch 45 are divided into 8ths, 16ths, 32nds, and 64ths in the same manner as already described in connection with the switch S of Fig. 1. The banks of the switch 46 are similarly divided into halves, quarters, etc. and are connected to the relays NP and PP in parallel with the corresponding banks of the switch 45.

When the key K is depressed the switch T starts to rotate and completes one rotation in the manner already described in connection with Fig. 1, and ground is therefore applied in succession to the wipers of the switch 45 and then to the wipers of the switch 46, causing the relays NP and PP to operate in accordance with the setting of the switches 45 and 46 to send out positive and negative pulses over the line L.

At the receiving end of the system the relays P and N are provided with associated circuits the same as in Fig. 1, the relay P causing ground to be applied to the wiper $t1$ each time it operates, while the relay N does not apply ground to the wiper $t1$, as already described in connection with the operation of the circuit of Fig. 1. Operation of either of the relays P and N cause the switch T1 to step at the end of each pulse and thus causes the wipers $t1$ to connect successively to the contacts of the bank $t1'$ and apply ground or no ground depending on which of the relays P and N were operated by the pulse.

There are twelve of these contacts and they are connected to twelve storing relays 50 to 61 inclusive. These relays are provided with locking circuits similarly to the relays A, B, C and D of Fig. 1, although these locking circuits have been omitted to avoid the confusion in the wiring. The first six relays 50 to 55 inclusive are connected to the first six contacts of the bank $t1'$ and a combination of these relays will be operated and locked as the wiper $t1$ sweeps over the first six contacts under control of the incoming positive and negative pulses from the setting of the switch 45. The relays 56 to 61 inclusive, being connected to the second half of the contacts of bank $t1'$, are operated in accordance with the pulses received under control of the second switch 46.

Instead of the switch S1 of Fig. 1 the two switches 22 and 23 of Figs. 4 to 9 inclusive are used to reproduce the transmitted bearing, these switches being connected similarly to the connection of the switch S1 in Fig. 1. The contacts of the banks of these switches are connected in groups in the same manner as the switches 45 and 46 and as clearly indicated in the switch S1 of Fig. 1. The first bank of contacts in switch 22 is divided into halves, the halves being connected respectively to the two armatures of the relay 50. The second bank of contacts is divided into quarters, alternate quarters being connected to the two armatures of the relay 51. The third, fourth, fifth and sixth banks of contacts of the switch 22 are divided into 8ths, 16ths, 32nds, and 64ths, and alternate groups are connected respectively to the two armatures of the relays 52 to 55 in the same manner. The switch 23 has its banks of contacts divided in exactly the same manner and the alternate groups of these contacts are connected to the respective two armatures of the relays 56 to 61 inclusive.

The wipers of the switches 22 and 23 are connected similarly to those of the switch S1 of Fig. 1. The first wiper in each switch is connected to ground and the remaining wipers are connected to contacts of the relays 50 to 61 inclusive in the same manner as shown in Fig. 1. These wiper connections have been omitted to avoid confusion in the drawings, but it will be understood from the circuit of Fig. 1 how these wipers are connected.

The switches 22 and 23 are connected to the driving mechanism 62 which corresponds to the driving mechanism shown in Figs. 4 to 9 inclusive which includes the magnets FD—BD and CFD—CBD. The motor M continuously drives the mechanism 62 and the switches 22 and 23 will operate either in a forward direction or reverse direction depending on the operation of the magnets FD, BD, CFD and CBD. The magnets FD and BD are controlled by the contacts of the relays 50 to 55 inclusive, as indicated, and the magnets CFD and CBD are controlled by the contacts of the relays 56 to 61 inclusive. The manner of control is the same as shown in Fig. 1 for the magnets FD and BD and the specific wiring has been omitted to avoid confusion. The switches 22 and 23, similarly to the switch S1 of Fig. 1, are stopped by the removal of battery by the operation of two relays CD and CD' which operate the same as the relay CD of Fig. 1. The relay CD is controlled by the contacts of the relay 55 and operates to remove the battery from the magnets FD and BD when the switch 22 has reached its proper destination. The relay CD' is controlled by the contacts of relay 61 and operates to stop the switch 23 by removing battery from the magnets CFD and CBD when the switch 23 has reached its proper destination.

It will be seen that switches 22 and 23 will both start to move as soon as the relay CA has released and battery has been applied to the magnets FD—BD and CFD—CBD and each will operate independently of the other, depending on the combination of relays operated in the two groups, until it reaches its proper destination, when the appropriate relay CD or CD' will cause it to stop.

The drive for the switches 22 and 23 would normally cease as soon as the associated relay CD or CD' operates after the last unit of the code has been received and the switches 22 and 23 have reached their proper destination because of the removal of battery from the magnets BD, FD, CBD and CFD. In such a case, however, the mechanism may stop before the setting of the wipers has been properly completed. To prevent this each of the wheels CG and 27 has pinned thereto a restoring cam (HC and HF) with corresponding jockey rollers SR1 and SR2. These are for the purpose of constraining the corresponding wheel to complete a movement which corresponds exactly to one step of the corresponding switch. The jockey rollers are carried on arms 14 and 15 pivoted on a shaft 16 and are held in contact with the corresponding cams by springs, one of which, designated 17, is shown in Fig. 4.

The restoring cam HF is heart-shaped, as seen in profile in Fig. 4, and has one rest position, as indicated at 41. The other restoring cam HC must have two diametrically opposite rest positions since the wheel CG rotates half a revolution for one step of the switch 23, and it must, therefore, be capable of stopping in either of the two positions. If, however, a 2:1 reduction gear is introduced after the wheel CG, the cam HC will be the same as HF.

It may however still happen that the wheel 27 or CG comes to rest too soon, so that the jockey roller cannot drive the mechanism to the proper stopping point. To allow for this, two pairs of contacts under the control of the arms 14 and 15 respectively may be provided. One of these contact pairs is shown at ONS in Fig. 4, and both, ONS and ONS', are shown in Fig. 10. These contacts are connected in parallel with the contacts cd1 and cd1' as shown in Fig. 10 and are adapted to be closed by the corresponding arm 14 or 15 except when the cam has nearly reached the rest position. Thus the drive is maintained after the contacts cd1 and cd1' has opened until the cam has reached a position in which the jockey roller can take control.

As above stated, the mechanism shown in Figs. 4 to 10 may be used as a transmitter to translate the bearings of an aeroplane into a code of signals based upon radix two. In this case the banks of the switches 22 and 23 will take the place of those of the switch S in Fig. 1, and the clutch relays FD and BD will then be controlled directly by the mechanism by which the bearing is measured, instead of by the contacts of the switches 22 and 23. If, for example, this mechanism rotates the loop of a directional antenna until a null position is reached as indicated by a detecting device, this device may be designed to control the clutches CP1 and CP of the transmitter with the help of coarse and fine adjustment relays according to well known principles. By a suitable modification of the above arrangements the two switches may be caused to follow the settings of two measuring dials set by hand, one for the coarse and one for the fine adjustment.

What is claimed is:

1. An electrical system for the remote indication of a bearing or other magnitude comprising a multi-bank uniselector switch located at a transmitting station having the contacts of the respective banks divided into groups of halves, quarters, and so on, with the contacts of each group connected together and with alternate groups of each bank connected together and to corresponding groups of the other banks forming two output circuits, means for setting the wipers of the said switch in accordance with the magnitude to be transmitted, a distributor for energizing the wipers of the banks of said switch in succession for the purpose of deriving a train of digital signal elements representing the bearing or magnitude expressed as a number in radix two, each signal element consisting of one of two possible conditions produced by energizing one of said two output circuits, and means for transmitting the signal elements from said two output circuits to a distant point.

2. A system according to claim 1 in which the output circuits are adapted to produce continuous potentials of opposed polarity and successive connections between the distributor and the wipers are separated by a time delay whereby the signal elements consist of continuous potentials of either polarity separated by intervals of zero potential.

3. A system according to claim 1 comprising a receiver which includes a distributor adapted to be stepped by the signal impulses in synchronism with the distributor at the transmitter.

4. A system as claimed in claim 1 in which the contacts in the banks of the multi-bank switch are strapped to two alternatively operable sending relays.

5. A system for receiving elements of a radix two number representing indications of a bearing or other magnitude transmitted from a remote point comprising a group of storage relays having contacts and circuits connected thereto, means to operate a combination of said relays in accordance with the received elements, a multi-bank selector switch adapted to be set in accordance with said bearing or other magnitude, provided with a bank of contacts for each storage relay and a wiper for each bank, driving means for said switch, means to operate said driving means, said switch having contacts of its respective banks arranged in groups of halves, quarters, eighths, and so on, with the contacts of each group connected together and with alternate groups of each bank connected together and to contacts of one of said storage relays associated with said bank, said contacts of all except the last storage relay being connected so that if said relay is not operated, one of said alternate groups of contacts will be connected to the wiper of the next adjacent bank, and if the said relay is operated, the same group of contacts will be connected so as to complete a circuit to energize said means to operate said driving means when the wiper of that bank is on one of the contacts of said group, while the other group of contacts will be connected to the wiper of the next adjacent bank, the last of said storage relays having contact connections whereby when said relay is unoperated, one of said groups of contacts of the bank associated therewith will be connected so as to deenergize said operating means when the wiper of that bank is on one of the contacts of said group, and when said relay is operated, said same group of contacts is connected to energize said means to operate said driving means when said wiper is on one of said contacts and said other group of contacts is connected so as to deenergize said operating means when said wiper is on one of said other group of contacts.

6. A system for receiving elements of a radix two number representing indications of a bearing or other magnitude in accordance with claim 5 in which the alternate groups of contacts including the first group of each bank of contacts in the selector switch is connected to the contacts of the associated storage relay so as to connect to the operating means of the driving means when the said relay is operated and, for all except the last relay, to the wiper of the next bank of contacts when the relay is unoperated, and for the last relay, so as to deenergize said operating means for said driving means when said relay is unoperated and said associated wiper is on one of said contacts of said group.

7. A system as claimed in claim 5 in which the selector switch adapted to be set in accordance with the magnitude or the like to be indicated, comprises a plurality of uniselector switches providing preliminary and final settings.

8. A system as claimed in claim 5 in which the selector switch adapted to be set in accordance with the magnitude or the like to be indicated comprises a plurality of uniselector switches providing preliminary and final settings and in which the preliminary switch has two wipers which are angularly out of phase by substantially one-half the distance between corresponding points on adjacent contacts and which engage with a single row of contacts alternately under the control of the setting of the final switch, so that despite the minute progressive movement of the preliminary switch in step with the larger movement of the final switch, the contact of the preliminary switch that is being engaged is always determined precisely.

9. An electrical system for the remote indication of a bearing or other magnitude comprising, at the transmitting station, a first multi-bank selector switch having the contacts of the respective banks divided into groups of halves, quarters, eighths, and so on with the contacts of each group connected together and with alternate groups of each bank connected together and to corresponding groups of the other banks, forming two output circuits, a second multi-bank selector switch having the contacts of the respective banks connected in the same manner as said first selector switch and in multiple therewith and with said two output circuits, means to connect the shafts of said switches together mechanically so that wipers of one switch will make one complete sweep of the contacts thereof each time the wipers of the other switch move from one set of contacts of the next adjacent set of contacts, means to set the wipers of said switches in a desired position, a distributor for energizing the banks of said switches in succession for the purpose of deriving a train of digital signal elements representing the bearing or magnitude to be transmitted expressed as a number in radix two, each signal element consisting of one of two possible conditions produced by energizing one of said two output circuits, means for transmitting the signal elements so produced, and, at the receiving station, means for receiving said elements thus transmitted, a plurality of storage relays, there being one for each bank of said first and second selector switches, a distributor under control of the incoming signals to connect said storage relays successively and to operate or not operate each of said relays in accordance with the condition of the associated signal element, means to lock any of said storage relays so operated, a third selector switch having the same number of banks of contacts as said first selector switch and having the contacts divided into groups and connected together in the same manner, a fourth selector switch having the same number of banks of contacts as said second selector switch and having the contacts divided into groups and connected together in the same manner as said second selector switch, driving means for each of said third and fourth selector switches, disconnecting means for the driving means of each of said third and fourth switches, means to connect the alternate groups of the contacts of each bank of said third and fourth selector switches respectively to contacts of an associated one of said storage relays in such a manner that when said relay is operated one of said alternate groups of contacts of the associated bank of said selector switches is connected to said driving means and the other group of all but the last bank of each switch is connected to the wiper of the next bank of said switch and the other group of said last bank is connected to said disconnection means for that switch, while if said relay is not operated the same group of contacts of all but the last bank is connected to the wiper of the next bank of contacts and the same group of contacts of the last bank is connected to said disconnecting means for that switch, and said other group of contacts is connected to said driving means.

10. A system as claimed in claim 9 in which each selector switch at the receiving station comprises a plurality of selector switches providing preliminary and final settings.

11. A system as claimed in claim 9 in which each selector switch at the receiving station comprises a plurality of selector switches providing preliminary and final settings and in which the preliminary switch has two wipers which are angularly out of phase by substantially one-half the distance between corresponding points on adjacent contacts and which engage with a single row of contacts alternately under the control of the setting of the final switch, so that, despite the minute progressive number of the preliminary switch in step with the larger number of the final switch, the contact of the preliminary switch that is being engaged is always determined precisely.

GEORGE CLIFFORD HARTLEY.
ERIC MALCOLM SWIFT McWHIRTER.
JOHN HANDLEY.